United States Patent [19]
Winterer et al.

[11] Patent Number: 5,062,004
[45] Date of Patent: Oct. 29, 1991

[54] DIGITAL SIGNAL PROCESSING CIRCUIT FOR VIDEO TAPE RECORDER

[75] Inventors: Martin Winterer; Hans-Jürgen Dèsor, both of Gundelfingen, Fed. Rep. of Germany

[73] Assignee: Deutsche ITT Industries GmbH, Freiburg, Fed. Rep. of Germany

[21] Appl. No.: 307,124

[22] Filed: Feb. 6, 1989

[30] Foreign Application Priority Data

Feb. 26, 1988 [EP] European Pat. Off. ........ 88102865.8

[51] Int. Cl.$^5$ ............................................. H04N 9/79
[52] U.S. Cl. .................................... 358/327; 358/310; 358/320; 358/328
[58] Field of Search ............... 358/310, 327, 320, 328, 358/330, 31, 36, 39

[56] References Cited

U.S. PATENT DOCUMENTS 4,757,390 7/1988 Mehrgardt et al. ................. 358/310
4,807,048 2/1989 Yasuda ................................ 358/320

FOREIGN PATENT DOCUMENTS 0118189 1/1984 European Pat. Off. .
0169930 8/1984 European Pat. Off. .

OTHER PUBLICATIONS

IRE Transactions on Electronic Computers, 9/59, "The Cordic Trigometric Computing Technique", Jack E. Volder, pp. 330-334.
IEEE Transactions on Consumer Electronics CE-32 (1986), Aug., No. 3, "Digital Video Signal Processing in Home VTRs", Shiro Kato et al.
"Digitaler Signalprozessor fur Videorecorder", by Sonke Mehrgardt at Intermetall, Freiburg, Germany, pp. 718-731, 12.Jahrestagung der FKTG.

Primary Examiner—Roy N. Envall, Jr.
Assistant Examiner—Thai Tran
Attorney, Agent, or Firm—Thomas L. Peterson

[57] ABSTRACT

An improved digital video signal processing circuit, for common use in the recording and playback modes of a video tape recorder, has a chrominance processing circuit for processing the chrominance signal of the input digital composite video signal through a first baseband mixer, a chrominance processor, and a second baseband mixer, and a luminance processing circuit for frequency modulating/demodulating the luminance signal, so that the processed chrominance and luminance signals can be added together to form an output digital composite video signal. The improved digital circuit automatically regulates the frequencies of the mixing signals for both mixers using line stepping signals obtained from a horizontal line sweep generator in the luminance processing circuit. The possibility of phase errors is eliminated, and quadrature errors in the chrominance signal are prevented.

7 Claims, 2 Drawing Sheets

DIGITAL SIGNAL PROCESSING CIRCUIT FOR VIDEO TAPE RECORDER

FIELD OF INVENTION

The present invention relates to a digital circuit for processing video signals for the recording and playback modes of a video tape recorder, and particularly, to a digital video signal processing circuit having means for preventing frequency or phase errors from occurring.

BACKGROUND OF INVENTION

The digital processing of video signals, e.g., in home video tape recorders (VTRs), allows replacement of analog video signal processing components for improvements in picture quality, performance, and ease of providing multiple or programmable functions. In conventional digital video signal processing circuitry, in the recording mode, the incoming composite video signal is converted to digital form and separated into a chrominance signal and a luminance signal. The luminance signal is frequency modulated to a standard color subcarrier frequency, while the chrominance signal is frequency-converted down to lower, color-under frequencies. The processed luminance and chrominance signals are then added together, D/A converted, amplified, and applied to recording/playback heads for recording on a video tape.

In the playback mode, the reproduced analog signals played back from the video tape are A/D converted, the frequency-modulated luminance signal is demodulated, the chrominance signal is frequency-converted back to its original state, and the two processed signals are added together to form a resulting digital composite video signal, which is then D/A converted and fed to a video signal output.

One example of a prior art digital video signal processing circuit is described in "Tagungsband, Teil 2, 12 Jarhrestagung der FKTG" (the German Television and Cinematics Society), pages 718-731, Mainz, West Germany, June 1986, compiled by G. Drechsler. As shown schematically in FIG. 2, the prior art circuit has an A/D converter aw at its input end, a first mixer q1, which is coupled to the color subcarrier frequency by a phase-locked loop comprising phase demodulator c, filter tp1, adder a1, and a first oscillator o1 outputting signals in quadrature phases (sine and cosine), an automatic gain control circuit, a chrominance signal processor cp which utilizes the chrominance signals mixed in the quadrature phases to output two color difference signals, a second mixer q2 which receives a mixing signal input in quadrature phases from a second oscillator o2, an adder a3 which adds the luminance and chrominance signals together, and an output D/A converter dw which passes the output signal to an amplifier rc and magnetic heads h.

In the recording mode (R), the input composite video signal fb is A/D converted, the luminance signal is frequency modulated through luminance processor lp, and the chrominance signal is mixed and coupled to the color subcarrier frequency through mixer q1 and the associated phase-locked loop which set the color subcarrier frequency in response to input from a mixer frequency switch unit mf. The chrominance signal is processed through chrominance processor cp and mixer q2 and associated oscillator o2 which sets the color-under frequency in response to the mixer frequency switch unit mf. In the playback mode (P), the input and output switch positions are changed so that video signals reproduced by the heads h are input to the digital signal processing circuit, and output composite video signals fb, are output from the VTR.

The above-described prior art has the problem that residual phase errors can occur in the chrominance signal processing and cause quadrature errors, which in turn become noticeable in the form of cross-color interferences between the two color difference (chrominance) signals.

SUMMARY OF INVENTION

In order to overcome the above-noted problem in the prior art circuitry, it is a principal object of the invention to provide an improved digital video signal processing circuit which allows automatic phase control of the oscillators generating the mixing signals in the chrominance signal processing. In accordance therewith, the invention comprises an improved digital video signal processing circuit in which the frequencies of the mixing signals from the oscillators are both derived from synchronous line sweep signals obtained from the luminance signal processing. By this improvement, any possible phase errors occurring between the two mixers of the chrominance processing side are leveled out completely, thus preventing any quadrature errors from arising.

BRIEF DESCRIPTION OF DRAWINGS

The above objects and further features and advantages of the invention are described in detail below in conjunction with the drawings, of which.

DETAILED DESCRIPTION OF INVENTION

Figure 1:
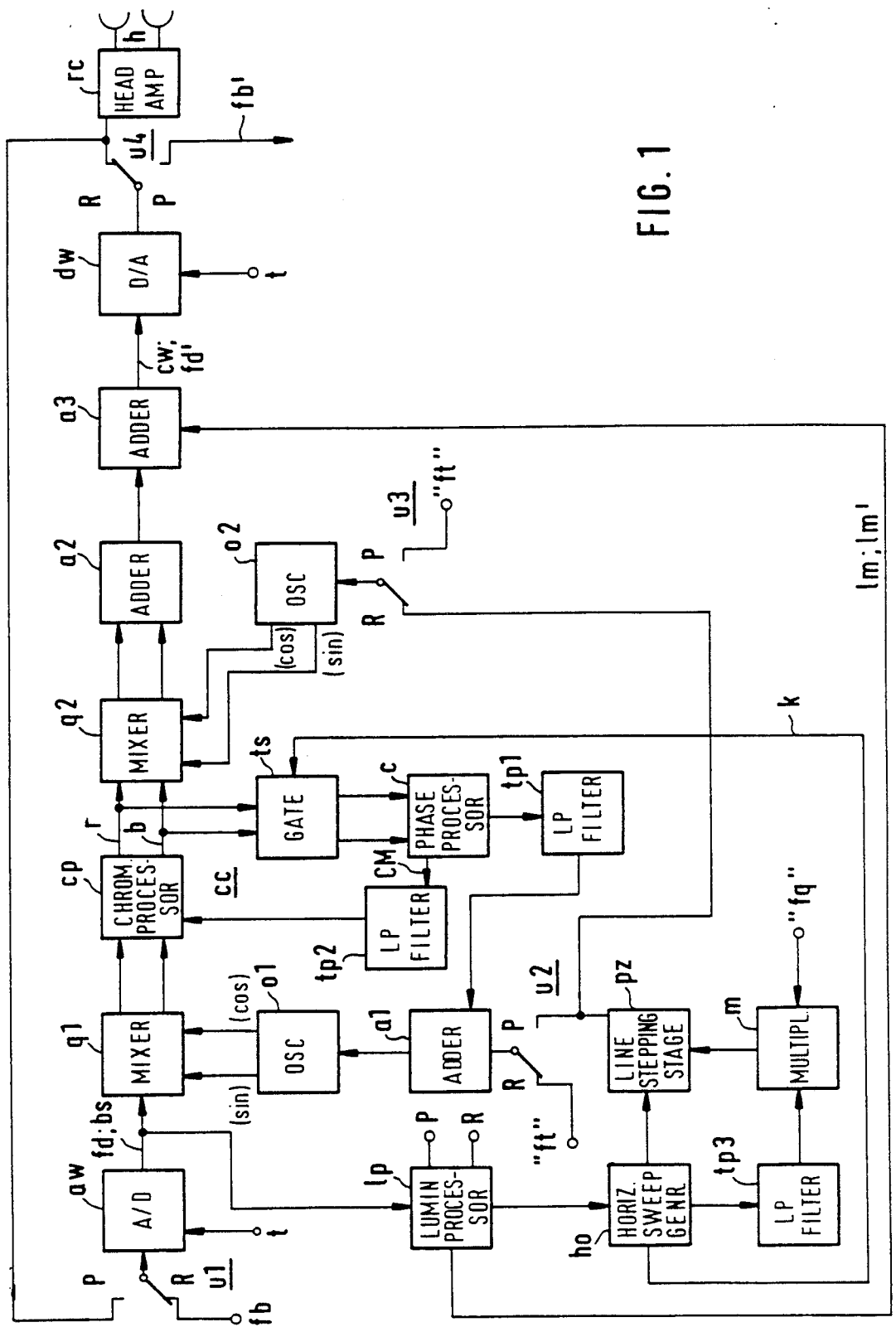
FIG. 1 is a schematic circuit diagram of a digital video signal processing circuit in accordance with the invention.
Figure 2:
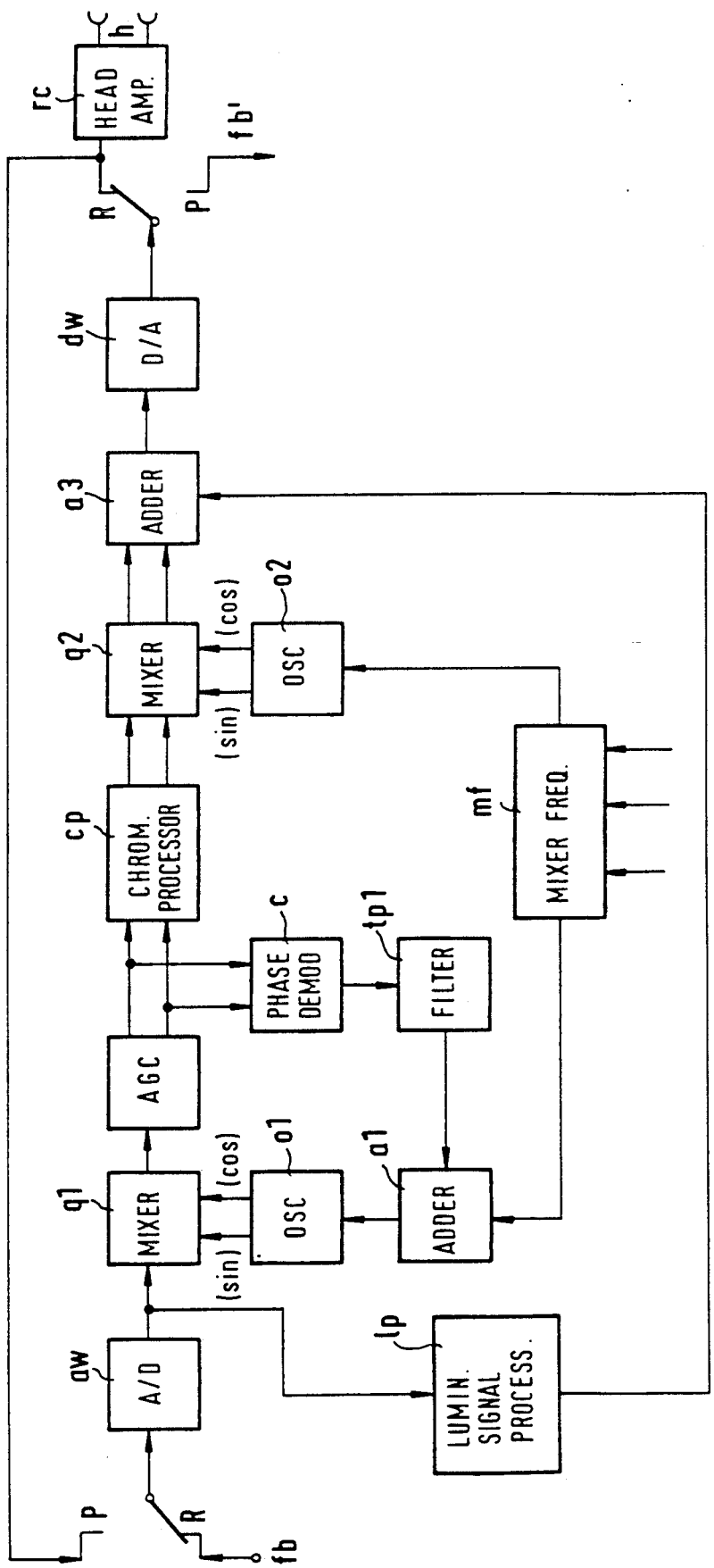
FIG. 2 is a schematic circuit diagram of a prior art digital video signal processing circuit.

The components of the embodiment of the invention shown in FIG. 1 which are similar to those described with respect to the prior art circuit in FIG. 2 are referenced by like alphanumeric characters. Referring to FIG. 1, the digital processing circuit of the invention is used in common for both the recording and playback modes of a VTR. Four changeover switches u1, u2, u3, and u4 are used to switch the states of the components between the recording position R and the playback position P. Switching the respective switch positions is accomplished by the person operating the video tape recorder in the known manner while selecting the desired operating mode. In FIG. 1, the changeover switches u1, u2, u3, and u4 are shown in the recording position R for the recording mode, and would all be switched to the playback position P for the playback mode. The switches are of the type having a number of parallel signal paths which are changed over at the same time, insofar as it is preferable in the invention to use processing of digital signals in parallel for faster signal processing. Similarly, the lines connecting the components of the processing circuit should be understood as being data buses having plural data lines on which data words having plural bits are transmitted in parallel. Only the input line to the A/D converter aw and the output line of the D/A converter dw are individual lines for analog signals.

With the changeover switch u1 in the recording position R, a composite color video signal fb, as well as a clock signal t, is fed to the A/D converter aw. The clock signal t has a frequency which is the same as used for the television standard, preferably 20.25 MHz. Accordingly, in the recording mode, the digital composite color video signal fd is obtained at the output of the A/D converter aw.

For the chrominance signal processing, the output signal fd is fed to the input of the first quadrature mixer q1 and mixed with a mixing signal of the baseband frequency. The mixer q1 receives two mixing signals in quadrature phases (sine and cosine) of each other from the first oscillator o1. The two output signals in quadrature relationship are fed from the mixer q1 to the chrominance processor cp which, in the known manner, separates therefrom the two color difference signals r and b, which are, e.g., red-yellow and blue-yellow color difference signals in demodulated and digital form.

The two color difference signals r and b are fed, on one hand, to the second quadrature mixture q2, which receives sine and cosine signals in quadrature phase of a lower, color-under frequency from the second oscillator o2. The output signals of the quadrature mixer q2 are fed to the input of the adder a2 where they are combined together. In the recording mode, the frequency of the first oscillator o1 is set to the standard color subcarrier frequency "ft" which is input at changeover switch u2, and the frequency of the second oscillator o2 is set to the color-under frequency "fu", as described further below.

The two color difference signals r and b at the output of the chrominance processor cp are also fed to a gating circuit ts which is switched to a conducting state during the periods of burst-key pulses k. The burst-key pulses k are provided from the luminance signal processing as described hereinafter. The outputs of the gating circuit ts are then fed to the respective inputs of the phase processor stage c which is a CORDIC processor (Coordinate Rotation Digital Computer) for computing a standard trigonometric algorithm solving for the magnitude and phase angle of the input signals. The CORDIC algorithm is described in detail in "IRE Transactions on Electronic Computers", 1959, pp. 330 to 334, cf. FIG. 2 thereof. The output magnitude signal cm is filtered through a low-pas filter tp2, and fed as an actuating quantity to the chrominance processor cp, which together therewith forms an automatic color control circuit cc.

The output phase angle signal ca from the CORDIC processor c is the phase demodulator data for the phase-locked loop to the first quadrature mixer q1, as described previously with respect to the prior art circuit of FIG. 2. The phase angle data is fed to the low-pass filter tp1 whose output is connected to one input of the adder stage a1. The other input of adder a1 is connected to the terminals of the changeover switch u2. In the recording mode, the digital data for the color subcarrier frequency "ft" is input to the adder a1 through changeover switch u2. In this way, the filtered phase angle data of the CORDIC stage is added to the frequency data, and the sum of these two signals is determinative of the frequency outputs of the oscillator o1.

For the luminance signal processing, the digital composite color signal fb is also fed from the A/D converter aw to a luminance processor lp which, in the conventional method for recording, converts the luminance signal lm into a frequency-modulated signal lm'. During playback, the processor lp demodulates the luminance signal lm from the frequency-modulated signal lm'. The luminance processor lp also produces, in the known manner, signals for synchronizing the horizontal sweep generator ho to the line frequency of the video signals. The sweep generator ho generates the burst-key pulses k which are fed to the gating circuit ts, as described previously.

The horizontal sweep generator ho also produces a signal representing the burst-key pulse frequency which, through low-pass filter tp3, is fed to one input of a multiplier stage m. For purposes of suppressing any possible noise influence of the first oscillator o1 by the horizontal sweep generator ho, the critical or cutoff frequency of the low-pass filter tp3 is set sufficiently low. The signal "fq" representing the television standard-dependent ratio of the color-under frequency "fu" to the line frequency is applied to the other input of the multiplier m.

The output of the multiplier m is provided to the line stepping stage pz. The line stepping phase pz also receives the output of the horizontal sweep generator ho and produces the television standard-dependent 90-degree phase stepping signals for the recording mode. The phase stepping signals are fed to the frequency-setting input of the second oscillator o2 via the changeover switch u3 in position R. In the playback mode, the output of the line stepping stage pz is fed, via changeover switch u2 in the position P, to the other input of the adder stage al. The stepping pulses for the stage pz originates with the horizontal sweep generator ho and is produced by it once per line.

The output luminance signal lm' (recording mode) of the luminance processor lm is provided to one input of the adder stage a3, the other input of which is connected to the output of the previous adder stage a2. Thus, at the output of adder a3 is provided digital signal cw which combines the chrominance signal at the color-under frequency and the frequency-modulated luminance signal lm'. The output recording signal cw is converted by D/A converter dw, which is clocked by the clock signal t, into the corresponding, analog composite signal. The analog signal is applied via the changeover switch u4 in the position R to the usual head amplifier circuit rc which supplies the heads h.

In the playback mode, with all changeover switches in the position P, the signal reproduced by heads h and amplified by amplifier rc is applied to the input of the A/D converter, aw which outputs the digital tape signal bs. The luminance processor lp demodulates the luminance signal lm from the taped luminance signal lm'. The output of the line stepping stage pz is applied to the adder a1, so that the data representing the color-under frequency is now applied to the oscillator o1. The oscillator o2 in turn receives the digital data representing the color subcarrier frequency "ft".

Accordingly, the quadrature mixer q1 again mixes into the baseband, and the chrominance processor cp generates the color difference signals r and b. The latter are processed in the CORDIC stage c, in the same way as in the recording mode, and the magnitude and phase angle outputs thereof are supplied to the chrominance processor cp and the adder a1. The quadrature mixer q2 now mixes the chrominance signals r and b with the color subcarrier frequency "ft", and the outputs thereof are added in adder a2 and further combined with the luminance signal in adder a3. The output thereof is the digital composite color video signal fd' which is converted, via D/A converter dw, to the analog composite color video signal fb' to be applied to the television receiver.

Preferably, the oscillators o1 and o2 are in the form of digital accumulators which add up the digital data supplied thereto by the system clock signal t. One embodiment of such oscillators are described in European Patent Application 259,514 of S. Mehrgardt.

Thus, the invention provides an improved digital video signal processing circuit which automatically regulates the frequencies of the mixing signals for both oscillators of the chrominance signal processing using the horizontal line sweep signals obtained from the luminance signal processing. The possibility of phase errors is therefore eliminated, and quadrature errors in the chrominance signal are thereby prevented.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

What is claimed is:

1. A digital signal processing circuit for common use in both recording and playback modes in a video tape recorder, said circuit being of the type receiving an input analog composite video signal from an external input in the recording mode, or reproduced from a video tape in the playback mode, and having an A/D converter for converting the input analog composite video signal to a corresponding input digital composite video signal, a first mixer for mixing the input digital composite video signal with a first baseband signal obtained from a first oscillator in order to derive a chrominance signal, a chrominance processor for deriving color difference signals from the chrominance signal from said first mixer, a second mixer for mixing the color difference signals from said chrominance processor with a second baseband signal obtained from a second oscillator a first adder for adding together the color difference signals mixed by said second mixer, a luminance processing circuit for frequency modulating/demodulating the input digital composite video signal branched from said A/D converter into a luminance signal, a second adder for combining the color difference signal from the chrominance processor with the luminance signal from said luminance processing circuit so as to form an output digital composite video signal, and a D/A converter for converting the output digital composite video signal into an output analog composite video signal which is fed to a video tape in the recording mode or a television receiver in the playback mode, wherein the improvement comprises:

a phase-locked loop (PLL) for said first mixer including a phase processor for receiving the color difference signals branched from the output of said chrominance processor and deriving a phase angle signal therefrom, a PLL adder receiving the phase angle signal from said phase processor at one input and a first frequency signal provided through a first recording/playback changeover switch at another input thereof, and said first oscillator receiving the output of said PLL adder and providing the first baseband signal to said first mixer;

said second oscillator receiving a second frequency signal through a second recording/playback changeover switch and providing the second baseband signal to said second mixer; and said luminance processing circuit including a luminance processor for frequency modulating/demodulating the luminance signal and for producing output synchronizing signals synchronized to a line frequency of the video signal, and a horizontal sweep generator receiving the output synchronizing signals from said luminance processor and producing a frequency signals from said corresponding to a color-under freqüency for the video signal, wherein said first recording/playback changeover switch is switched to a recording position to receive an input color subcarrier frequency signal in the recording mode, and to a playback position to receive an input of the color-under frequency signal from said horizontal sweep generator of said luminance processing circuit in the playback mode, in order to provide the respective frequency signal to said PLL adder of said phase-looked loop; and wherein said second recording/playback changeover switch is switched to a playback position to receive an input color subcarrier frequency signal in the playback mode, and to a recording position to receive an input of the color-under frequency signal from said horizontal sweep generator of said luminance processing circuit in the recording mode, in order to provide the respective frequency signal to said second oscillator.

2. A digital signal processing circuit according to claim 1, wherein said luminance circuit further includes a multiplier for receiving the synchronizing signals from said horizontal sweep generator at one input, and a signal representing a television standard-dependent ratio of the color-under frequency to the line frequency at another input, and a line stepping stage connected to said horizontal sweep generator and the output of said multiplier for producing television standard-dependent 90-degree phase stepping signals, which are provided to said first changeover switch for the playback mode and to said second changeover switch for the recording mode.

3. A digital signal processing circuit according to claim 1, wherein said first and second mixers are quadrature mixers, said first and second oscillators each provide a pair of mixing signals to the respective mixer which are 90 degrees of phase in quadrature from each other, and said chrominance signal is mixed by said first mixer to form output signals in quadrature phase, and said chrominance processor provides the output color difference signals in quadrature phase.

4. A digital signal processing circuit according to claim 3, wherein said phase-locked loop further includes a gating circuit receiving the quadrature phased color difference signals at the output of said chrominance processor, said phase processor is a CORDIC digital processor which outputs a phase angle signal derived from the phased color difference signals, and said horizontal sweep generator of said luminance processing circuit further outputs burst-key pulses to said gating circuit, wherein said gating circuit is rendered conductive during the periods of the burst-key pulses to provide the phased color difference signals in pulsed sequence to said CORDIC processor.

5. A digital signal processing circuit according to claim 4, wherein said chrominance processor includes an automatic color control circuit formed by said gating circuit, said CORDIC digital processor providing a magnitude signal derived from the phased color difference signals, and the magnitude signal being provided as an input magnitude signal to said chrominance processor.

6. A digital signal processing circuit according to claim 1, further comprising a further changeover switch for switching between respective positions for connecting the input to said A/D converter to an external input source in the recording mode, and to receive an input of video signals reproduced from the video tape in the playback mode.

7. A digital signal processing circuit according to claim 1, further comprising a further changeover switch for switching between respective positions for connecting the output from said D/A converter to an external output to a television receiver in the playback mode, and to a head amplifier for video tape recording heads in the recording mode.

* * * * *